(12) United States Patent
Li

(10) Patent No.: US 11,699,284 B2
(45) Date of Patent: Jul. 11, 2023

(54) DATA COLLECTION METHOD, UNMANNED AERIAL VEHICLE (UAV) AND STORAGE MEDIUM

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 304 days.

(21) Appl. No.: 17/081,085

(22) Filed: Oct. 27, 2020

(65) Prior Publication Data

US 2022/0129661 A1    Apr. 28, 2022

(51) Int. Cl.
*G08G 5/00* (2006.01)
*G06V 20/17* (2022.01)
*B64C 39/02* (2023.01)
*B64U 101/30* (2023.01)

(52) U.S. Cl.
CPC ............ *G06V 20/17* (2022.01); *B64C 39/024* (2013.01); *G08G 5/003* (2013.01); *B64U 2101/30* (2023.01); *B64U 2201/00* (2023.01)

(58) Field of Classification Search
CPC .. G08G 5/0013; G08G 5/0069; H04B 17/318; H04W 4/40; H04W 24/02; B64C 39/024; B64C 2201/042; B64C 2201/145; B64C 2201/146; H04L 5/0053
See application file for complete search history.

(56) References Cited

U.S. PATENT DOCUMENTS

| 2014/0152507 | A1* | 6/2014 | McAllister | G06K 7/10376 342/126 |
| 2019/0324449 | A1* | 10/2019 | Wang | G01C 21/1656 |

* cited by examiner

*Primary Examiner* — Peter D Nolan
*Assistant Examiner* — Roy Rhee

(57) ABSTRACT

The present invention discloses a data collection method, an unmanned aerial vehicle (UAV) and a storage medium. The method is used for a vision chip of the UAV, the vision chip including a main operating system and a real-time operating system, and the method includes: generating, by the real-time operating system, a trigger signal; collecting, by the real-time operating system based on the trigger signal, flight control data of the UAV and controlling an image sensor to collect an image sequence; synchronizing, by the real-time operating system, a time of the main operating system with a time of the real-time operating system; and performing, by the main operating system, visual processing on the flight control data and the image sequence, to ensure that the flight control data and the image sequence are collected synchronously. By using the method, accuracy of data collected during controlling of the UAV can be improved.

9 Claims, 4 Drawing Sheets

DATA COLLECTION METHOD, UNMANNED AERIAL VEHICLE (UAV) AND STORAGE MEDIUM

BACKGROUND

Technical Field

Embodiments of the present invention relates to the technical field of data processing, and in particular, to a data collection method, an unmanned aerial vehicle (UAV) and a storage medium.

Related Art

An unmanned aerial vehicle is abbreviated as "UAV", and is an unmanned aircraft operated by a radio remote control device and a self-provided program control device, or is completely or indirectly autonomously operated by a computer. Acquisition of an image and flight control data in the UAV is the core of UAV control. In the UAV, the flight control data and the image needs to be collected synchronously. If a difference between the two time points is too great, wrong processing is performed visually. For example, when the UAV passes through the woods, flies forward and just turned right, and it is visually detected that there is a tree on the right, and if information from the flight control data is delayed and is not information about currently flying to the right, the UAV may hit a tree. The flight control data may include, but be not limited to, position coordinate information and attitude data.

The image and flight control data of the UAV are processed to generate control data of the UAV, which may be called visual processing. In the UAV, the visual processing generally runs on a Linux operating system, while the Linux operating system is a non-real-time operating system. The Linux operating system may have a great fluctuation when acquiring flight control data. For example, the flight control data collected by the UAV requires less than 2 ms fluctuation in time, but the Linux operating system has a fluctuation more than 20 ms, which leads to inaccurate collection of the flight control data and wrong visual processing, so that the UAV is poorly controlled.

SUMMARY

Embodiments of the present invention provide a data collection method, an unmanned aerial vehicle (UAV) and a storage medium, so as to improve accuracy of data collected during controlling of the UAV.

In a first aspect, an embodiment of the present provides a data collection method used for a vision chip of the UAV, the vision chip including a main operating system and a real-time operating system, and the method includes:

generating, by the real-time operating system, a trigger signal;

collecting, by the real-time operating system based on the trigger signal, flight control data of the UAV and controlling an image sensor to collect an image sequence;

synchronizing, by the real-time operating system, a time of the main operating system with a time of the real-time operating system; and performing, by the main operating system, visual processing on the flight control data and the image sequence, to ensure that the flight control data and the image sequence are collected synchronously.

Optionally, the synchronizing, by the real-time operating system, a time of the main operating system with a time of the real-time operating system includes:

determining, by the main operating system, delay information of the real-time operating system and the main operating system; and determining, by the real-time operating system, a system time of the real-time operating system according to the delay information and a system time of the main operating system.

Optionally, the determining delay information of the real-time operating system and the main operating system includes:

determining the delay information based on a first system time and a second system time, where the first system time is a current system time of the main operating system sent by the main operating system to the real-time operating system at a first moment, and the second system time is a system time when the main operating system receives feedback on the first system time from the real-time operating system.

Optionally, the determining a system time of the real-time operating system according to the delay information and a system time of the main operating system includes:

subtracting a third system time from the first system time, and adding the delay information to obtain first information, where the third system time is a system time when the real-time operating system receives the first system time;

subtracting a fifth system time from a fourth system time, and adding the delay information to obtain second information, where the fourth system time is a current system time of the main operating system sent by the main operating system to the real-time operating system at a second moment, and the fifth system time is a system time when the real-time operating system receives the third system time; and adding, if an absolute value of the first information and an absolute value of the second information are both greater than a set error value, the delay information to the fourth system time to obtain the system time of the real-time operating system.

Optionally, the performing, by the main operating system, visual processing on the flight control data and the image sequence includes:

acquiring, by the main operating system, a time stamp of the flight control data and a time stamp of each image frame in the image sequence; and selecting, from the flight control data by the main operating system according to the time stamp of the flight control data and the time stamp of each image frame, flight control data matching an image frame collection time in the image sequence.

Optionally, the acquiring a time stamp of the flight control data and a time stamp of each image frame in the image sequence includes:

acquiring a system time of the real-time operating system when collecting the flight control data;

determining that the system time of the real-time operating system when collecting the flight control data is the time stamp of the flight control data; and determining the time stamp of each image frame in the image sequence according to an exposure time of the image sensor and a trigger time point of the trigger signal.

Optionally, the selecting, from the flight control data according to the time stamp of the flight control data and the time stamp of each image frame, flight control data matching an image frame collection time in the image sequence includes:

determining that in the flight control data, flight control data with the smallest absolute value of a difference from a time stamp of an image frame is the flight control data matching the image frame collection time.

Optionally, a pulse beat of the trigger signal is not less than twice a frequency of the flight control data.

In a second aspect, an embodiment of the present invention further provides a UAV, including:

a fuselage;

an arm connected to the fuselage;

a power device disposed on the arm and configured to provide flight power for the UAV; and a vision chip including a main operating system and a real-time operating system communicatively connected to the main operating system; where the real-time operating system is configured to:

generate a trigger signal;

based on the trigger signal, collect flight control data of the UAV, and control an image sensor to collect an image sequence; and synchronize a time of the main operating system with a time the real-time operating system; and the main operating system is configured to: perform visual processing on the flight control data and the image sequence, to ensure that the flight control data and the image sequence are collected synchronously.

Optionally, the main operating system is configured to: determine delay information of the real-time operating system and the main operating system; and the real-time operating system is configured to determine a system time of the real-time operating system according to the delay information and a system time of the main operating system.

Optionally, the main operating system is configured to:

determine the delay information based on a first system time and a second system time, where the first system time is a current system time of the main operating system sent by the main operating system to the real-time operating system at a first moment, and the second system time is a system time when the main operating system receives feedback on the first system time from the real-time operating system.

Optionally, the main real-time system is configured to:

subtract a third system time from the first system time, and add the delay information to obtain first information, where the third system time is a system time when the real-time operating system receives the first system time;

subtract a fifth system time from a fourth system time, and add the delay information to obtain second information, where the fourth system time is a current system time of the main operating system sent by the main operating system to the real-time operating system at a second moment, and the fifth system time is a system time when the real-time operating system receives the third system time; and add, if an absolute value of the first information and an absolute value of the second information are both greater than a set error value, the delay information to the fourth system time to obtain the system time of the real-time operating system.

Optionally, the main operating system is configured to:

acquire a time stamp of the flight control data and a time stamp of each image frame in the image sequence; and select, from the flight control data according to the time stamp of the flight control data and the time stamp of each image frame, flight control data matching an image frame collection time in the image sequence.

Optionally, the main operating system is configured to:

acquire a system time of the real-time operating system when collecting the flight control data;

determine that the system time of the real-time operating system when collecting the flight control data is the time stamp of the flight control data; and determine the time stamp of each image frame in the image sequence according to an exposure time of the image sensor and a trigger time point of the trigger signal.

Optionally, the main operating system is configured to:

determine that in the flight control data, flight control data with the smallest absolute value of a difference from a time stamp of an image frame is the flight control data matching the image frame collection time.

Optionally, a pulse beat of the trigger signal is not less than twice a frequency of the flight control data.

In a third aspect, an embodiment of the present invention further provides a computer-readable storage medium storing a computer program. When the program is executed by a processor, the data collection method provided by the embodiments of the present invention is implemented.

An embodiment of the present invention provides a data collection method, a UAV, and a storage medium. By using the foregoing technical solution, the image sequence and flight control data may be collected under the control of the trigger signal generated by the real-time operating system. The real-time operating system synchronizes a time of the main operating system with a time of the real-time operating system. The main operating system performs visual processing on the flight control data and the image sequence, to ensure that the flight control data and the image sequence are collected synchronously. Accuracy of data collected during controlling of the UAV is improved effectively.

DETAILED DESCRIPTION

The following further describes the present invention in detail with reference to the accompanying drawings and embodiments. It can be understood that specific embodiments described herein are only used to explain the present invention, but not to limit the present invention. In addition, it should also be noted that for ease of description, only parts related to the present invention rather than all structures are shown in the accompanying drawings.

Before the exemplary embodiments are described in more details, it should be noted that, some exemplary embodiments are described as processing or methods depicted in flowcharts. Although the operations (or steps) in a flowchart are described as being processed sequentially, many operations in the flowchart may be performed in parallel, concurrently, or simultaneously. In addition, the sequence of the operations may be rearranged. When the operations in the flowchart are completed, the processing may be terminated. However, there may be further additional steps that are not included in the accompanying drawings. The processing may correspond to a method, a function, a procedure, a subroutine, a subprogram, or the like. In addition, the embodiments in the present invention and features in the embodiments may be mutually combined in case that no conflict occurs.

Embodiment 1

Figure 1A:
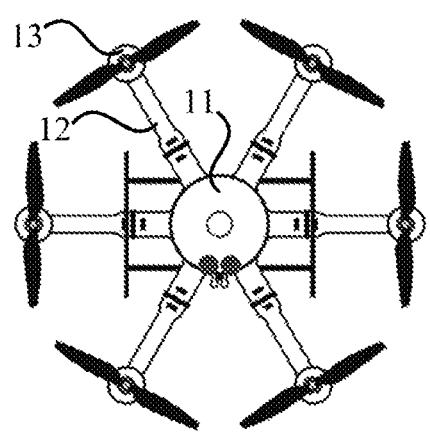
FIG. 1a is a schematic structural diagram of an unmanned aerial vehicle according to Embodiment 1 of the present invention.

FIG. 1a is a schematic structural diagram of an unmanned aerial vehicle (UAV) according to an embodiment of the present invention.

As shown in FIG. 1a, the UAV provided in this embodiment includes: a fuselage 11;

an arm 12 connected to the fuselage 11;

a power device 13 disposed on the arm 12 and configured to provide flight power for the UAV; and a vision chip (not show) including a main operating system and a real-time operating system in communication connection with the main operating system.

The real-time operating system is configured to:

generate a trigger signal;

based on the trigger signal, collect flight control data of the UAV, and control an image sensor to collect an image sequence; and synchronize a time of the main operating system with a time the real-time operating system; and the main operating system is configured to: perform visual processing on the flight control data and the image sequence, to ensure that the flight control data and the image sequence are collected synchronously.

In this embodiment, the vision chip may be located on the UAV, and a specific position of the vision chip on the UAV is not limited. A data acquisition method may be implemented in the vision chip to ensure the flight control data and the image sequence are collected synchronously. In an embodiment of the present invention, there is multiple image sensors distributed in front, rear, left, right, up and down directions of the fuselage 11 of the UAV. The multiple image sensors are multi-channel vision lens inputs of the UAV or multi-channel visual sensor inputs.

The vision chip includes a main operating system and a real-time operating system. In an embodiment of the present invention, the main operating system and the real-time operating system may run on two different processors on the vision chip respectively. The main operating system may be a main operating system configured to perform visual processing. In an embodiment of the present invention, the main operating system may be a linux operating system. Because the linux operating system has a great fluctuation, the present invention introduces one real-time operating system. The real-time operating system may be configured to collect flight control data and generate a stable trigger source for the image sensor to control the image sensor to collect an image sequence.

The real-time operating system may be understood as an operating system that ensures completion of a specific function within a certain time limit. The real-time operating system refers to an operating system as follows: the operating system can accept and process, at a sufficiently fast speed, an external event or data when generated, and a result of processing may be used to control a production process or respond quickly to a processing system within a specified time, dispatch all available resources to complete a real-time task and control all real-time tasks to run in unison. The real-time operating system is mainly characterized with providing of timely response and high reliability.

The trigger signal may be understood as a signal that triggers the collection of an image sequence and flight control data. The trigger signal may be a pulse signal, and the real-time operating system may output the trigger signal every set time to control the synchronous collection of the image sequence and the flight control data. The trigger signal may be generated by a trigger source in the real-time operating system.

When the image sequence is collected, at least one image sensor may be controlled through a pulse signal to perform collection of the image sequence. After various image sensors receive the trigger signal, the various image sensors synchronously collect their respective image sequences. The image sensor may perform global exposure, that is, one image is generated at a time. An image frame included in a collected image sequence may be a visual image, that is, an image obtained by a machine in replace of human eyes. For example, the data collection method is applied to the UAV, and the image may be a picture obtained from the perspective of the UAV. Different Image sensors may be set at different positions of the UAV.

There may be at least one image sensor in this embodiment. Image sequences of the UAV from different perspectives may be collected through multi-channel image sensors. The image sequence may be understood as a sequence composed of multiple image frames. The multi-channel image sensors collect multiple image sequences synchronously. The multi-channel image sequences may be exposed simultaneously.

The flight control data includes, but is not limited to, position coordinate information and attitude data. The position coordinate information may be understood as spatial coordinates of a position. The attitude data is collected through an accelerometer, a gyroscope, a magnetic compass, GPS and other attitude sensors. The attitude data may be understood as information representing an attitude. Specific content included in the attitude data is determined based on an adopted attitude sensor.

It may be understood that a frequency at which the real-time operating system collects flight control data is less than a frequency at which an image frame in the image sequence is collected. When the image sequence and flight control data are collected based on the trigger signal, one image frame may correspond to a set number of pieces of flight data. The set number is not limited and may be determined by those skilled in the art according to the frequency at which the flight control data is collected.

It should be noted that a frequency of the trigger signal is at least twice the frequency at which the flight control data is collected. If the frequency of the flight control data is NHz, a minimum pulse beat of the pulse signal is 2 NHz, so as to ensure fast acquisition of the flight control data. N is a positive integer, such as N=200.

After the trigger signal is used to control the multi-channel image sensors to collect the image sequence, the multi-channel image sensors may transmit the image sequence collected respectively to the main operating system. After the trigger signal is used to control collection of the set number of pieces of the flight control data, each piece of the flight control data is transmitted to the main operating system through the real-time operating system.

The main operating system performs visual processing after receiving the image sequence and the flight control data to obtain, through matching, flight control data of the image frame in a corresponding image sequence. In particular, for each image frame in the image sequence, the main operating system selects the flight control data whose collection time corresponds to a time when the image frame is collected, and then the image sequence and the selected flight control data may be used as control data.

The control data may be understood as data used to control the UAV. The control data may control a flight status of the UAV. The control data includes but is not limited to speed data, acceleration data and angular velocity data.

The real-time operating system and the main operating system are different operating systems. Before data collection is performed through the main operating system and the real-time operating system, time synchronization processing needs to be performed on the two systems to prevent the image sequence and the flight control data from mismatching, that is, an image frame in the image sequence and flight control data are not acquired at the same moment.

During synchronization of a time of the real-time operating system with a time of the main operating system, the main operating system may send a current system time of the main operating system to the real-time operating system. The real-time operating system, when receiving the system time sent by the main operating system, sends feedback of successful receiving information to the main operating system. Specific content of the successful receiving information is not limited and is only used to identify the system time received by the real-time operating system and sent by the main operating system.

The main operating system, after receiving the successful receiving information, acquires system time of the current main operating system. Delay information is determined according to the system time at the time of receiving and sending by the main operating system.

During synchronization of the time of the real-time operating system and the time of the main operating system, the main operating system may further send the current system time of the main operating system to the real-time operating system. The real-time operating system, after receiving the system time sent by the main operating system, determines the system time of the real-time operating system according to the system time and set delay information. After the system time of the real-time operating system is determined, the system time of the real-time operating system may be changed based on the determined system time. The set delay information may be a preset delay value, such as a delay value set according to an empirical value.

The UAV provided in this embodiment may stably collect flight control data through the main operating system and real-time operating system included in the vision chip, and is not affected, during collection of the flight control data, by a fluctuation of the main operating system, so as to ensure the flight control data and the image sequence are collected synchronously, effectively improving accuracy of data collection during control of the UAV.

Optionally, the main operating system is configured to: determine delay information of the real-time operating system and the main operating system; and the real-time operating system is configured to determine a system time of the real-time operating system according to the delay information and a system time of the main operating system.

During synchronization of the time of the main operating system and the time of the real-time operating system, the main operating system may first determine delay information of the real-time operating system and the main operating system. The delay information may be understood as a transmission time when the main operating system is communicatively connected to the real-time operating system.

The delay information may be determined based on a time difference between the main operating system and the real-time operating system for data interaction. For example, the main operating system sends first data to the real-time operating system, and the real-time operating system sends second data to the main operating system after receiving the first data. The main operating system determines the delay information according to a time at which the first data is sent and a time at which the second data is received. Content of the first data and the second data is not limited, such as a system time when the data is respectively received or sent. In addition, the real-time operating system may further send third data to the main operating system. The main operating system, after receiving the third data, sends fourth data to the real-time operating system. The real-time operating system determines delay information according to a time at which the third data is sent and a time at which the fourth data is received. Content of the third data and the fourth data is not limited, such as a system time when the data is respectively received or sent.

The real-time operating system, when determining the system time, may receive the system time of the main operating system sent by the main operating system to determine the system time of the real-time operating system based on the received system time of the main operating system and the delay information. For example, the system time of the real-time operating system is obtained by adding the delay information to the system time of the main operating system.

Optionally, the main operating system is configured to: determine the delay information based on a first system time and a second system time, where the first system time is a current system time of the main operating system sent by the main operating system to the real-time operating system at a first moment, and the second system time is a system time when the main operating system receives feedback on the first system time from the real-time operating system.

In an embodiment, the main operating system sends the current system time, that is, the first system time, of the main operating system to the real-time operating system. The main operating system, when receiving feedback on the first system time of the real-time operating system, acquires the current system time as the second system time. In this step, the delay information may be determined based on a time difference between the first system time and the second system time. For example, the delay information is obtained by subtracting the first system time from the second system time and then dividing the result, through subtracting, by 2.

The first moment may be a time when the main operating system sends a current system time of the main operating system to the real-time operating system during a period of determining of the delay information. It may be understood that the first system time may be considered as a system time when the main operating system sends data, and the main operating system sends the first system time. The second system time is a system time when the main operating system receives feedback from the real-time operating system. The feedback is feedback of the real-time operating system based on the first system time.

Optionally, the main real-time system is configured to: subtract a third system time from the first system time and add the delay information to obtain first information, where the third system time is a system time when the real-time operating system receives the first system time;

subtract a fifth system time from a fourth system time and add the delay information to obtain second information, where the fourth system time is a current system time of the main operating system sent by the main operating system to the real-time operating system at a second moment, and the fifth system time is a system time when the real-time operating system receives the third system time; and add, if an absolute value of the first information and an absolute value of the second information are both greater than a set error value, the delay information to the fourth system time to obtain the system time of the real-time operating system.

It may be understood that if the system time of the real-time operating system is slightly different from the system time of the main operating system, there is no need to modify the system time of the real-time operating system. Therefore, when the system time of the real-time operating system is determined according to the delay information and the system time of the main operating system, the time difference between the main operating system and the real-time operating system may be determined.

In particular, if the absolute value of the first information and the absolute value of the second information are both greater than a set error value (such as 2), it may be considered that the system time of the real-time operating system needs to be modified. Correspondingly, the real-time operating system uses the received fourth system time plus the delay information as the current system time of the real-time operating system.

A second moment is a time when the main operating system sends the current system time of the main operating system to the real-time operating system during determining of the system time of the real-time operating system. It may be understood that the fourth system time may be regarded as the system time when the main operating system sends data to the real-time operating system again, and the main operating system sends the fourth system time. The fifth system time is a system time of the real-time operating system when the real-time operating system receives the fourth system time.

Optionally, the main operating system is configured to:

acquire a time stamp of the flight control data and a time stamp of each image frame in the image sequence; and select, from the flight control data according to the time stamp of the flight control data and the time stamp of each image frame, flight control data matching an image frame collection time in the image sequence.

The main operating system, when performing visual processing on flight control data and the image sequence, may look through each image frame in the image sequence, and select, from the flight control data according to the time stamp of the flight control data and the time stamp of each image frame, flight control data matching an image frame collection time.

In particular, for each image frame in the image sequence, the flight control data matching the time stamp of the image frame is selected from the flight control data according to the time stamp of the image frame. Matching with the time stamp of the image frame may be understood as a deviation from the time stamp of the image frame within a set range. In other words, the selected flight control data matches a time at which the image frame is collected.

Optionally, the main operating system is configured to:

acquire a system time of the real-time operating system when collecting the flight control data;

determine that the system time of the real-time operating system when collecting the flight control data is the time stamp of the flight control data; and determine the time stamp of each image frame in the image sequence according to an exposure time of the image sensor and a trigger time point of the trigger signal.

Optionally, the main operating system is configured to:

determine that in the flight control data, flight control data with the smallest absolute value of a difference from a time stamp of an image frame is the flight control data matching the image frame collection time.

Optionally, a pulse beat of the trigger signal is not less than twice a frequency of the flight control data.

Figure 1B:
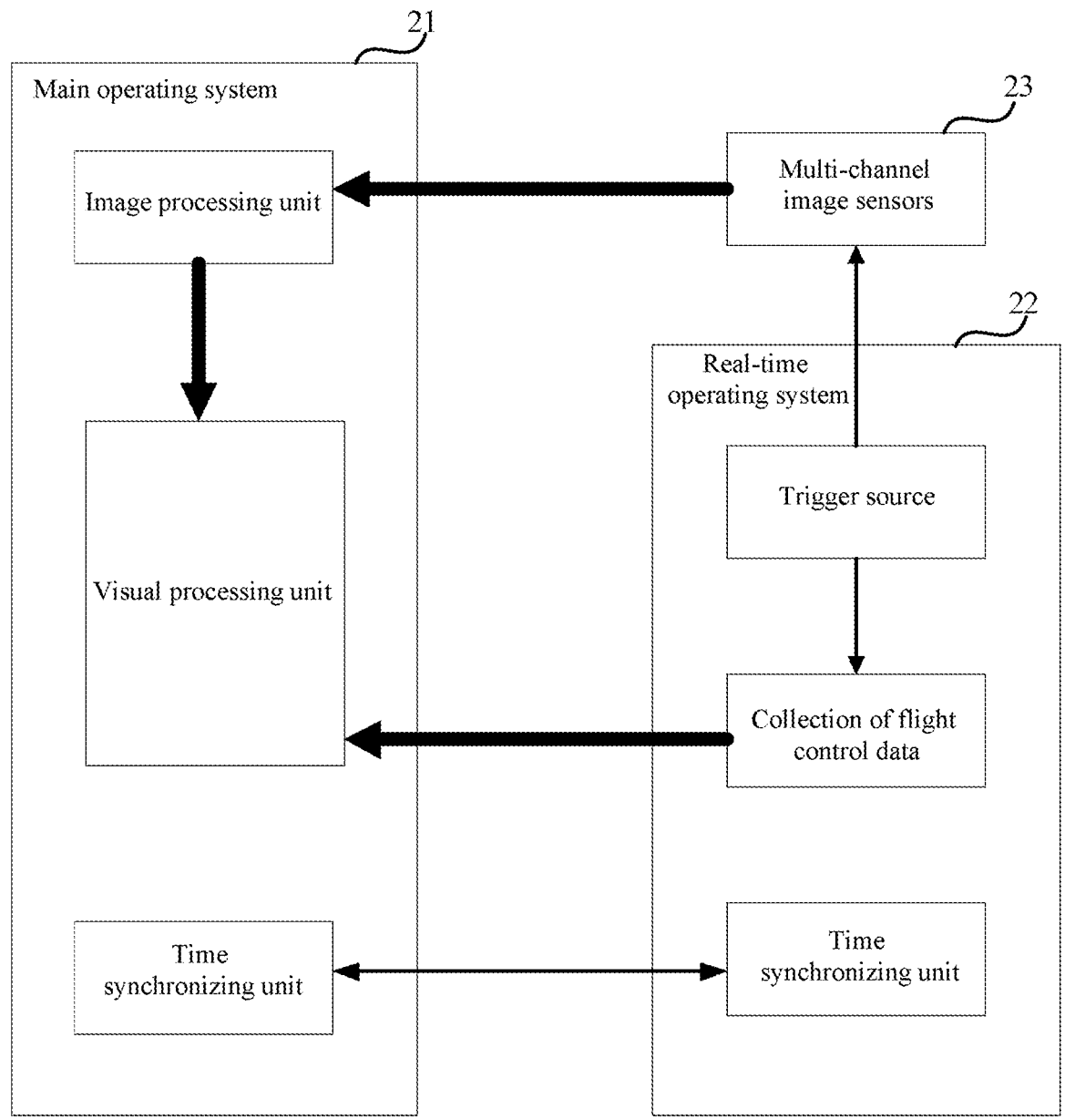
FIG. 1b is a schematic flow diagram of a data collection according to an embodiment of the present invention.
Figure 1C:
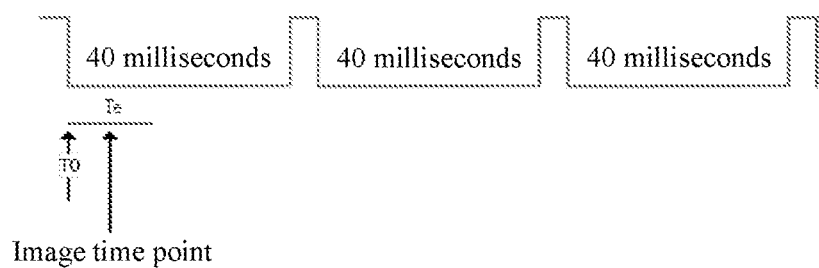
FIG. 1c is a schematic diagram of a trigger signal according to an embodiment of the present invention.

FIG. 1b is a schematic flow diagram of data collection according to an embodiment of the present invention, and FIG. 1c is a schematic diagram of a trigger signal according to an embodiment of the present invention. Referring to FIG. 1b and FIG. 1c, the UAV may include a main operating system 21 and a real-time operating system 22. The main operating system 21 and the real-time operating system 22 may run on two different processors on a vision chip, respectively. A trigger source in the real-time operating system 22 generates a trigger waveform diagram as shown in FIG. 1c. The trigger signal is used to trigger multiple image sensors 23. The multi-channel image sensors 23 are external trigger sensors. The multi-channel image sensors 23 output image frames involuntarily, and is triggered by relying on an external clock pulse, that is, triggered by the trigger signal. The trigger source generates one pulse every M milliseconds. The multi-channel image sensors 23 generate 1000/M image frames per second based on the pulse, and then transmit the image frames to an image processing unit of the main operating system 21. Then, a visual processing unit of the main operating system 21 performs processing.

In an embodiment, referring to FIG. 1c, one pulse is generated every 40 milliseconds. An image output frame rate is 25 frames/second. Assuming that an image trigger is a falling edge trigger, a trigger time point is T0. The image sensor performs global exposure, that is, one image is generated at a time. Assuming that a current exposure time of the image sensor is Te, a time point of the image is: T0+Te/2, that is, the time stamp of the image.

The exposure time varies with a change of a scene. At an outdoor scene with strong light, the exposure time may be reduced to 1 millisecond. At an indoor dark scene, the exposure time may be increased to several tens of milliseconds. Generally, the exposure time may be limited to no more than 15 milliseconds.

In the image processing unit, it is necessary to record the time stamp on each image frame and transmit the time stamp to the visual processing unit along with the image frame.

The visual processing unit may rely on the time stamp of the image frame to find flight control data at a corresponding time point.

The trigger source generates a pulse beat of a higher frequency, and the flight control data is collected on the real-time operating system 22. Each piece of flight control data after collected and current latest time T1 on the real-time operating system 22 are sent to the visual processing unit for processing.

The main operating system 21 gets the time-stamped image frame and the time-stamped flight control data. Based on the time-stamp T0+Te/2 of the image frame, most matched flight control data with a time point is found in a flight control data sequence. Matched data may be found through min|T0+Te/2−$T_{1n}$|. $T_{1n}$ identifies a time stamp corresponding to each piece of flight control data. A number of n is the same as a number of pieces of the flight control data.

Figure 1D:
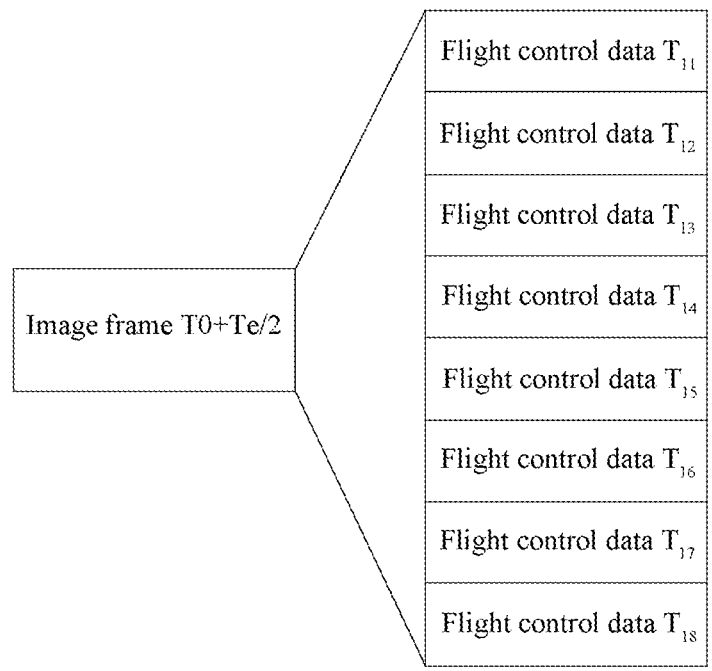
FIG. 1d is a schematic diagram of a correspondence between an image and flight control data according to an embodiment of the present invention.

FIG. 1d is a schematic diagram of a correspondence between an image and flight control data according to an embodiment of the present invention. Referring to FIG. 1d, because multi-channel image sensors perform image sequence collection synchronously, time stamps corresponding to various image sequences may be considered the same. Here, for example, one image frame included in one image sequence is described. When the main operating system performs processing, collected data includes one image frame and 8 pieces of flight control data. A time stamp of the image frame is T0+Te/2, and the 8 pieces of flight control data are: flight control data $T_{11}$, flight control data $T_{12}$, flight control data $T_{13}$, flight control data $T_{14}$, flight control data $T_{15}$, flight control data $T_{16}$, flight control data $T_{17}$ and flight control data $T_{18}$. The main operating system may determine the flight control data matching the image frame collection time from the 8 pieces of flight control data.

Figure 1E:
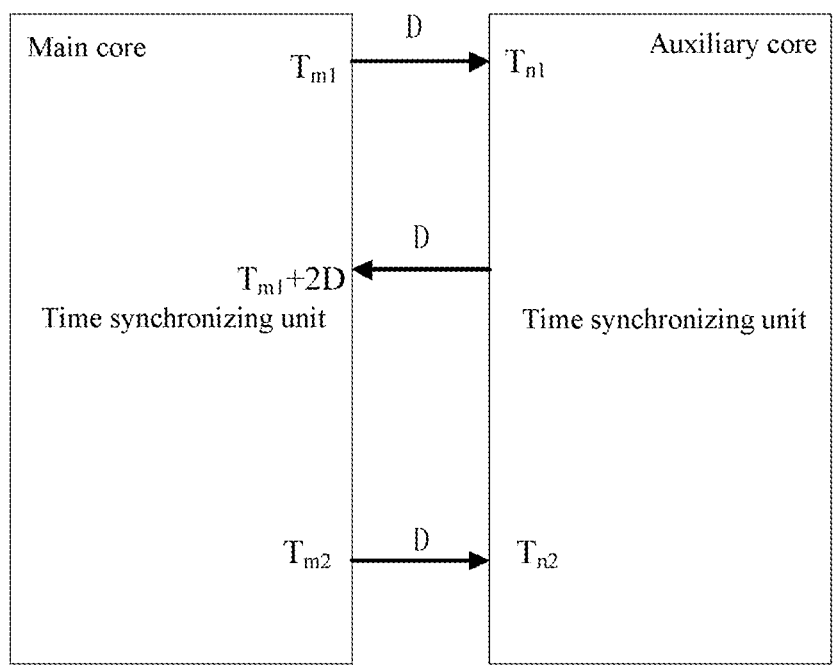
FIG. 1e is a schematic flow diagram of time synchronization according to an embodiment of the present invention.

In order to ensure accuracy of data collection, synchronization of a time of the main operating system with a time the real-time operating system may further be performed in this embodiment. FIG. 1e is a schematic flow diagram of time synchronization according to an embodiment of the present invention. Referring to FIG. 1e, a main operating system 21 and a real-time operating system 22 are two different cores and different operating systems. The two systems need to be synchronized in time; otherwise a visual processing unit matches an image sequence with flight control data in a completely inaccurate manner. Assuming that a system time of the main operating system 21 is Tm, and a system time of the real-time operating system 22 is Tn, a method for time synchronization is show as follows:

A time synchronizing unit of the main operating system 21 sends its own time $T_{m1}$ to the real-time operating system 22. A time synchronizing unit of the real-time operating system 22 receives a message and immediately returns the message to the main operating system 21, while saving a value of $T_{m1}$ and a current system time $T_{n1}$ of the real-time operating system 22. The time synchronizing unit of the main operating system 21 calculates a delay D through a time difference.

The time synchronizing unit of the main operating system 21 sends a current time $T_{m2}$ to the real-time operating system 22. A current system time of the real-time operating system 22 is $T_{n2}$. If the following conditions are met simultaneously:

$$\begin{cases} |T_{m2} + D - T_{n2}| > 2 \\ |T_{m1} + D - T_{n1}| > 2 \end{cases}$$

the real-time operating system 22 changes the system time to $T_{m2}$+D.

The UAV provided in this embodiment may stably collect flight control data. Collection of the flight control data is not affected by a fluctuation of the main operating system. During collection of the image data, multi-channel image sequences may be collected synchronously, and the multi-channel image sequences are exposed simultaneously. A time point of each image frame is consistent with a time point of a corresponding flight control data in the image sequence. During performing of visual processing, closest flight control data in time is found according to a time stamp of the image frame to obtain an actual image frame and flight control data at a same moment, so as to perform visual processing more accurately.

Embodiment 2

Figure 2:
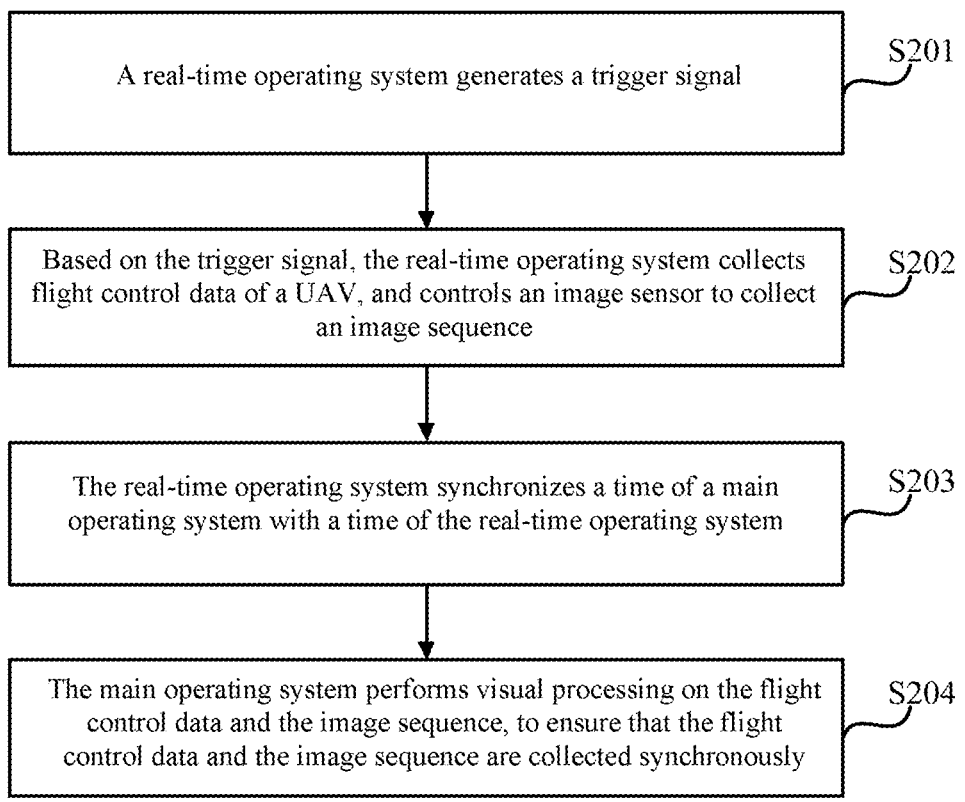
FIG. 2 is a schematic flow diagram of a data collection method according to Embodiment 2 of the present invention.

FIG. 2 is a schematic flow flowchart of a data collection method according to Embodiment 2 of the present invention. The method may be applied to data collection, and may be implemented by a vision chip of the UAV. For details not stated in this embodiment, please refer to the foregoing embodiment.

As shown in FIG. 2, a data collection method according to the present invention is used for a vision chip of the UAV. The vision chip includes a main operating system and a real-time operating system. The method includes the following steps.

S201: The real-time operating system generates a trigger signal.

S202: The real-time operating system, based on the trigger signal, collects flight control data of the UAV and controls an image sensor to collect an image sequence.

S203: The real-time operating system synchronizes a time of the main operating system with a time of the real-time operating system.

S204: The main operating system performs visual processing on the flight control data and the image sequence to ensure that the flight control data and the image sequence are collected synchronously.

An embodiment of the present invention provides a data collection method. By using the foregoing method, the image sequence and flight control data may be collected under the control of the trigger signal generated by the real-time operating system. The real-time operating system synchronizes a time of the main operating system with a time of the real-time operating system. The main operating system performs visual processing on the flight control data and the image sequence, to ensure that the flight control data and the image sequence are collected synchronously. Accuracy of data collected during controlling of the UAV is improved effectively.

Optionally, the synchronizing, by the real-time operating system, a time of the main operating system with a time of the real-time operating system includes:

determining, by the main operating system, delay information of the real-time operating system and the main operating system; and determining, by the real-time operating system, a system time of the real-time operating system according to the delay information and a system time of the main operating system.

Optionally, the determining delay information of the real-time operating system and the main operating system includes:

determining the delay information based on a first system time and a second system time, where the first system time is a current system time of the main operating system sent by the main operating system to the real-time operating system at a first moment, and the second system time is a system time when the main operating system receives feedback on the first system time from the real-time operating system.

Optionally, the determining a system time of the real-time operating system according to the delay information and a system time of the main operating system includes:

subtracting a third system time from the first system time and adding the delay information to obtain first information, where the third system time is a system time when the real-time operating system receives the first system time;

subtracting a fifth system time from a fourth system time and adding the delay information to obtain second information, where the fourth system time is a current system time of the main operating system sent by the main operating system to the real-time operating system at a second moment, and the fifth system time is a system time when the real-time operating system receives the third system time; and adding, if an absolute value of the first information and an absolute value of the second information are both greater than a set error value, the delay information to the fourth system time to obtain the system time of the real-time operating system.

Optionally, the performing, by the main operating system, visual processing on the flight control data and the image sequence includes:

acquiring, by the main operating system, a time stamp of the flight control data and a time stamp of each image frame in the image sequence; and selecting, from the flight control data by the main operating system according to the time stamp of the flight control data and the time stamp of each image frame, flight control data matching an image frame collection time in the image sequence.

Optionally, the acquiring a time stamp of the flight control data and a time stamp of each image frame in the image sequence includes:

acquiring a system time of the real-time operating system when collecting the flight control data;

determining that the system time of the real-time operating system when collecting the flight control data is the time stamp of the flight control data; and determining the time stamp of each image frame in the image sequence according to an exposure time of the image sensor and a trigger time point of the trigger signal.

Optionally, the selecting, from the flight control data according to the time stamp of the flight control data and the time stamp of each image frame, flight control data matching an image frame collection time in the image sequence includes:

determining that in the flight control data, flight control data with the smallest absolute value of a difference from a time stamp of an image frame is the flight control data matching the image frame collection time.

Optionally, a pulse beat of the trigger signal is not less than twice a frequency of the flight control data.

Embodiment 3

Embodiment 3 of the present invention provides a computer-readable storage medium storing a computer program. The program, when executed by a processor, is configured to implement a data collection method that is used for a vision chip of a UAV. The vision chip includes a main operating system and a real-time operating system. The method includes:

generating, by the real-time operating system, a trigger signal;

collecting, by the real-time operating system based on the trigger signal, flight control data of the UAV, and controlling an image sensor to collect an image sequence;

synchronizing, by the real-time operating system, a time of the main operating system with a time of the real-time operating system; and performing, by the main operating system, visual processing on the flight control data and the image sequence, to ensure that the flight control data and the image sequence are collected synchronously.

Optionally, the program, when executed by a processor, may further be configured to implement the data collection method provided by any embodiment of the present invention.

The computer storage medium in the embodiments of the present invention may adopt any combination of one or more computer-readable media. The computer-readable medium may be a computer-readable signal medium or a computer-readable storage medium. The computer-readable storage medium may be, for example, but not limited to, an electrical, magnetic, optical, electromagnetic, infrared, or semiconductor system, apparatus, or device, or any combination thereof. In a more specific example (a non-exhaustive list), the computer-readable storage medium includes an electrical connection having one or more wires, a portable computer magnetic disk, a hard disk, a random access memory (RAM), a read-only memory (ROM), an erasable programmable read only memory (EPROM) or flash memory, an optical fiber, a portable compact disk read-only memory (CD-ROM), an optical storage medium, a magnetic storage medium, or any suitable combination thereof. The computer-readable storage medium may be any tangible medium containing or storing a program, and the program may be used by or used in combination with an instruction execution system, an apparatus, or a device.

The computer-readable signal medium may include a data signal being in a baseband or propagated as a part of a carrier, the data signal carrying computer-readable program code. The propagated data signal may be in various forms, including but not limited to, an electromagnetic signal, an optical signal, or any suitable combination thereof. The computer-readable signal medium may alternatively be any computer-readable medium other than the computer-readable storage medium. The computer-readable medium may send, propagate or transmit a program for use by or in combination with an instruction execution system, apparatus or component.

The program code included in the computer-readable storage medium may be transmitted by using any suitable medium, including but not limited to: wireless transmission, a wire, a cable, radio frequency (RF) or the like, or any suitable combination thereof.

One or more programming languages or any combination thereof may be used to write the computer program code used for performing the operations in the present invention. The programming languages include an object oriented programming language such as Java, Smalltalk, C++, or the like and a conventional procedural programming language, such as the C programming language or a similar programming language. The program code may be executed entirely on a computer of a user, partly on the computer of the user, as a stand-alone software package, partly on the computer of the user and partly on a remote computer, or entirely on the remote computer or a server. For the case involving a remote computer, the remote computer may be connected to a computer of a user through any type of network including a local area network (LAN) or a wide area network (WAN), or may be connected to an external computer (for example, through the Internet by using an Internet service provider).

It should be noted that, the foregoing descriptions are merely exemplary embodiments of the present invention and applied technical principles. It can be understood by a person skilled in the art that, the present invention is not limited to the specific embodiments herein, and various obvious changes, readjustments, and replacements may be made by a person skilled in the art without departing from the protection scope of the present invention. Therefore, although the present invention is described in detail with reference to the foregoing embodiments, the present invention is not limited to the foregoing embodiments, and may further include more other equivalent embodiments without departing from the concepts of the present invention. The scope of the present invention is subject to the appended claims.

What is claimed is:

1. A data collection method used for a vision chip of an unmanned aerial vehicle (UAV), wherein the vision chip comprises a main operating system and a real-time operating system, and the method comprises steps of:
   generating, by the real-time operating system, a trigger signal;
   collecting, by the real-time operating system based on the trigger signal, flight control data of the UAV, and controlling an image sensor to collect an image sequence;
   synchronizing, by the real-time operating system, a time of the main operating system with a time of the real-time operating system; and
   performing, by the main operating system, visual processing on the flight control data and the image sequence, to ensure that the flight control data and the image sequence are collected synchronously;
   wherein the synchronizing step comprises:
   determining, by the main operating system, delay information of the real-time operating system and the main operating system based on a first system time and a second system time; wherein the first system time is a current system time of the main operating system sent by the main operating system to the real-time operating system at a first moment, and the second system time is a system time when the main operating system receives feedback on the first system time from the real-time operating system; and
   determining, by the real-time operating system, a system time of the real-time operating system according to the delay information and a system time of the main operating system, wherein the system time of the real-time operating system is determined by performing steps of:
   subtracting a third system time from the first system time, and adding the delay information to obtain first information, wherein the third system time is a system time when the real-time operating system receives the first system time;
   subtracting a fifth system time from a fourth system time, and adding the delay information to obtain second information, wherein the fourth system time is a current system time of the main operating system sent by the main operating system to the real-time operating system at a second moment, and the fifth system time is a system time when the real-time operating system receives the third system time; and
   adding, if an absolute value of the first information and an absolute value of the second information are both greater than a set error value, the delay information to the fourth system time to obtain the system time of the real-time operating system.

2. The method according to claim 1, wherein the performing, by the main operating system, visual processing on the flight control data and the image sequence comprises:
   acquiring, by the main operating system, a time stamp of the flight control data and a time stamp of each image frame in the image sequence; and
   selecting, from the flight control data by the main operating system according to the time stamp of the flight control data and the time stamp of each image frame, flight control data matching an image frame collection time in the image sequence.

3. The method according to claim 2, wherein the acquiring a time stamp of the flight control data and a time stamp of each image frame in the image sequence comprises:
   acquiring a system time of the real-time operating system when collecting the flight control data;
   determining that the system time of the real-time operating system when collecting the flight control data is the time stamp of the flight control data; and
   determining the time stamp of each image frame in the image sequence according to an exposure time of the image sensor and a trigger time point of the trigger signal.

4. The method according to claim 1, wherein a pulse beat of the trigger signal is not less than twice a frequency of the flight control data.

5. A computer readable storage medium storing a computer program, wherein the program is executed by a processor and the data collection method according to claim 1 is implemented.

6. An unmanned aerial vehicle (UAV), comprising:
   a fuselage;
   an arm connected to the fuselage;
   a power device disposed on the arm and configured to provide flight power for the UAV; and
   a vision chip comprising a main operating system and a real-time operating system communicatively connected to the main operating system; wherein
   the real-time operating system is configured to:
   generate a trigger signal;
   based on the trigger signal, collect flight control data of the UAV, and control an image sensor to collect an image sequence; and synchronize a time of the main operating system with a time the real-time operating system; and
   the main operating system is configured to: perform visual processing on the flight control data and the image sequence, to ensure that the flight control data and the image sequence are collected synchronously;
   wherein the main operating system is further configured to:
   determine delay information of the real-time operating system and the main operating system based on a first system time and a second system time, wherein the first system time is a current system time of the main operating system sent by the main operating system to the real-time operating system at a first moment, and the second system time is a system time when the main operating system receives feedback on the first system time from the real-time operating system; and
   wherein the real-time operating system is further configured to:
   determine a system time of the real-time operating system according to the delay information and a system time of the main operating system;
   subtract a third, system time from the first system time, and add the delay information to obtain first information, wherein the third system time is a system time when the real-time operating system receives the first system time;

subtract a fifth system time from a fourth time, and add the delay information to obtain second information, wherein the fourth system time is a current system time of the main operating system sent by the main operating system to the real-time operating system at a second moment; and the fifth system time is a system time when the real-time operating system receives the third system time; and add, if an absolute value of the first information and an absolute value of the second information are both greater than a set error value, the delay information to the fourth system time to obtain the system time of the real-time operating system.

7. The UAV according to claim 6, wherein the main operating system is configured to:

acquire a time stamp of the flight control data and time stamp of each image frame in the image sequence; and select, from the flight control data according to the time stamp of the flight control data and the time stamp of each image frame, flight control data matching an image frame collection time in the image sequence.

8. The UAV according to claim 7, wherein the main operating system is configured to:

acquire a system time of the real-time operating system when collecting the flight control data;

determine that the system time of the real-time operating system when collecting the flight control data is the time stamp of the flight control data; and determine the time stamp of each image frame in the image sequence according to an exposure time of the image sensor and a trigger time point of the trigger signal.

9. The UAV according to claim 4, wherein a pulse beat of the trigger signal is not less than twice a frequency of the flight control data.

* * * * *